US009191146B2

(12) United States Patent
Jia et al.

(10) Patent No.: US 9,191,146 B2
(45) Date of Patent: Nov. 17, 2015

(54) METHODS PERMITTING A WIRELESS SYSTEM RECEIVER TO DETERMINE AND REPORT CHANNEL CONDITIONS TO A SYSTEM TRANSMITTER

(71) Applicant: QUALCOMM Incorporated, San Diego, CA (US)

(72) Inventors: Zhanfeng Jia, Belmont, CA (US); Shu Du, Milpitas, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 13/924,377

(22) Filed: Jun. 21, 2013

(65) Prior Publication Data

US 2014/0269377 A1 Sep. 18, 2014

Related U.S. Application Data

(60) Provisional application No. 61/780,902, filed on Mar. 13, 2013.

(51) Int. Cl.
*H04L 1/00* (2006.01)
*H04L 1/16* (2006.01)
*H04L 1/20* (2006.01)

(52) U.S. Cl.
CPC ............... *H04L 1/00* (2013.01); *H04L 1/0025* (2013.01); *H04L 1/0026* (2013.01); *H04L 1/1671* (2013.01); *H04L 1/20* (2013.01)

(58) Field of Classification Search
CPC .................................................... H04W 24/00
USPC ......................................................... 370/252
See application file for complete search history.

(56) References Cited

U.S. PATENT DOCUMENTS

| 2007/0002892 A1* | 1/2007 | Waxman ....................... 370/465 |
| 2010/0296407 A1 | 11/2010 | Medvedev et al. |
| 2011/0105025 A1 | 5/2011 | Wang et al. |
| 2011/0164524 A1 | 7/2011 | Kawamoto et al. |
| 2012/0005177 A1 | 1/2012 | Bao et al. |

(Continued)

OTHER PUBLICATIONS

IEEE Draft P802.11-REVmb/D9.0, May 2011, IEEE Standard for Information Technology—Telecommunications and information exchange between systems—Local and metropolitan area networks—Specific requirements Part 11: Wireless LAN Medium Access Control (MAC) and Physical Layer (PHY) Specifications.

(Continued)

*Primary Examiner* — Brandon Renner
*Assistant Examiner* — Abdullahi Ahmed
(74) *Attorney, Agent, or Firm* — Holland & Hart LLP

(57) ABSTRACT

A method of providing feedback on channel observations to a transmitter includes observing a channel at a receiver based on received signals from the transmitter and determining whether a packet error rate (PER) is rising based on the observing. The receiver determines whether a rising PER is caused by channel noise or interference, and transmits a message to the transmitter indicating the cause of the rising PER. The cause may be encoded in reserved bits of a block acknowledgement (BA) frame or an Acknowledge (ACK) frame, or in a modulation coding scheme (MCS) used to transmit the message. The cause may be detected in response to SNR/RSSI level of received signals, or a number of receiver restarts. The transmitter may change the transmit rate adaptation algorithm to use a lower MCS if channel noise causes the rising PER, and a higher MCS if interference causes the rising PER.

24 Claims, 4 Drawing Sheets

(56) References Cited

U.S. PATENT DOCUMENTS

| | | | |
|---|---|---|---|
| 2012/0307747 A1* | 12/2012 | MacInnis et al. | 370/329 |
| 2013/0329774 A1* | 12/2013 | Potharaju | 375/224 |
| 2014/0241168 A1* | 8/2014 | Merlin et al. | 370/241 |

OTHER PUBLICATIONS

IEEE P802.11ac/D1.0, Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHZ, May 2011.

Zarikoff, B., et al., "A non-parametric approach to estimating ambient noise levels in the presence of bursty interference," IEEE Wireless Communications Letters, Apr. 2012, vol. 1, No. 2, pp. 69-72.

* cited by examiner

METHODS PERMITTING A WIRELESS SYSTEM RECEIVER TO DETERMINE AND REPORT CHANNEL CONDITIONS TO A SYSTEM TRANSMITTER

RELATED APPLICATION

This application claims priority under 35 U.S.C. §119(e) to U.S. Provisional Application Ser. No. 61/780,902, entitled "Methods Permitting A Wireless System Receiver To Determine And Report Channel Conditions To A System Transmitter", filed on Mar. 13, 2013, which is herein incorporated by reference in its entirety.

BACKGROUND

1. Field of the Disclosure

The invention relates generally to wireless communication systems, such as multi-user Wi-Fi® systems, and more particularly to methods for providing feedback on channel observations from a wireless receiver to a wireless transmitter.

2. Related Art

Performance of a wireless network, e.g., a wireless network complying with an IEEE 802.11 standard, depends on channel noise and interference present on the wireless medium. Both channel noise and interference can cause decoding errors in received packets, thereby increasing the packet error rate (PER) in a receiving wireless station.

Channel noise is relatively constant background noise that interferes with the reception of a transmitted signal at a receiving wireless station. In general, channel noise cannot be decoded to provide a meaningful signal. Every object emits some spectrum of radiation waves (heat/energy), referred to as thermal noise, which contributes to channel noise. Another possible source of channel noise includes energy emitted from microwave ovens. In general, channel noise cannot be avoided by a receiving wireless station.

In contrast, interference, as defined herein, is an intermittently transmitted signal, which is generally capable of being decoded by some receiver, but which temporarily interferes with the reception of a transmitted signal at an intended receiving wireless station. Examples of interference signals include signals transmitted by 'hidden nodes' in a Wi-Fi system, signals transmitted on adjacent channels in a Wi-Fi system, and signals transmitted by other technologies, such as Bluetooth, which operate in the same frequency band as a Wi-Fi system. In general, interference can be avoided in some manner, for example, by techniques such as the request-to-send/clear-to-send (RTS/CTS) mechanism of the IEEE 802.11 specification (which addresses hidden node interference), changing the communication channel in response to the detected interference (which addresses interference from signals transmitted on adjacent channels), or implementing co-existence mechanisms (which allow interfering signals to share the channel with the receiving wireless station).

The receiving wireless station typically does not determine a packet error rate of a received packet. Rather, for each received packet, the receiving wireless station transmits a block acknowledge (BA) frame to the transmitting wireless station, wherein the BA frame includes a bit map that indicates whether or not specific sub-frames of the packet were successfully received. The transmitting wireless station calculates the packet error rate in response to the bit map of the received BA frame. The transmitting wireless station then uses the calculated packet error rate in a rate adaptation algorithm to select a modulation & coding scheme (MCS) used to transmit future packets. If the packet error rate becomes high, the rate adaptation algorithm determines that the channel condition has deteriorated, and in response, the transmitting wireless station reduces the physical layer (PHY) data rate (with higher coding gain) to transmit future packets.

As described above, the transmitting wireless station is informed of packet errors, but is not informed whether these packet errors occurred as a result of channel noise or interference. As long as the packet error rate increased as a result of channel noise, reducing the PHY data rate with higher coding gain should result in a reduced packet error rate for subsequently transmitted packets. However, if the packet error rate increased as a result of interference, and the transmitting wireless station reduces the PHY data rate of the subsequently transmitted packets, the transmission time of these subsequently transmitted packets will increase, undesirably increasing the chance that these transmitted packets will encounter more interference, further increasing the packet error rate. It would therefore be desirable to have a method and apparatus for overcoming this problem. More specifically, it would be desirable to have a wireless system that allows a transmitting wireless station to adjust the MCS used to transmit packets in a manner that takes into account whether an increased packet error rate is a result of channel noise or interference.

SUMMARY

In accordance with one embodiment of the present invention, a method is provided for sending feedback on channel observations in a wireless system to a system transmitter. A system receiver observes the condition of a wireless communication channel based on the signals received from the transmitter. The receiver determines whether a packet error rate (PER) of the received data is rising (i.e., channel worsening), and if so, determines whether the PER is rising as a result of channel noise or interference. The receiver transmits a message to the transmitter indicating whether the rising PER is the result of channel noise or interference. If the rising PER is the result of channel noise, the transmitter may respond by transmitting at a lower MCS with higher gain. Conversely, if the rising PER is the result of interference, the transmitter may respond by transmitting at a higher MCS.

The message transmitted to the receiver may include one or more reserved bits of a block acknowledgement (BA) frame or an acknowledgement (ACK) frame, which are used to indicate whether the rising PER is caused by channel noise or interference. In another embodiment, the MCS used to transmit the message identifies whether the rising PER is caused by channel noise or interference.

In one embodiment, the receiver determines whether the rising PER is caused by channel noise or interference by monitoring a signal-to-noise ratio (SNR) and/or received signal strength indicator (RSSI) associated with the received packets. If the SNR/RSSI is less than a predefined threshold value, the cause of the rising PER is designated as channel noise. Conversely, if the SNR/RSSI is greater than the threshold value, the cause of the rising PER is designated as channel interference.

In another embodiment, the receiver determines whether the rising PER is caused by channel noise or interference by monitoring the number of times the receiver restarts during a predefined time period. If the receiver restarts a predetermined number of times during the predefined time period, then the cause of the rising PER is designated as interference. Conversely, if the receiver restarts fewer than the predetermined number of times during the predefined time period, the cause of the rising PER is designated as channel noise.

In accordance with other embodiments, structures for implementing the above-described methods are provided.

The present invention will be more fully understood in view of the following description and drawings.

DETAILED DESCRIPTION OF THE DRAWINGS

In wireless networks such as Wi-Fi, interference and channel noise can both cause decoding errors in received packets. In accordance with one embodiment of the present invention, different corrective actions are taken to compensate for errors resulting from channel noise and errors resulting from interference. More specifically, if a packet error is caused by channel noise, the wireless transmitter will reduce the PHY data rate with higher coding gain. If the packet error is caused by interference (which is typically intermittent in nature), the wireless transmitter will increase the PHY data rate, thereby reducing the required transmission time of subsequently transmitted packets, such that it is less likely that these subsequently transmitted packets are adversely affected by the intermittent interference.

Figure 1:
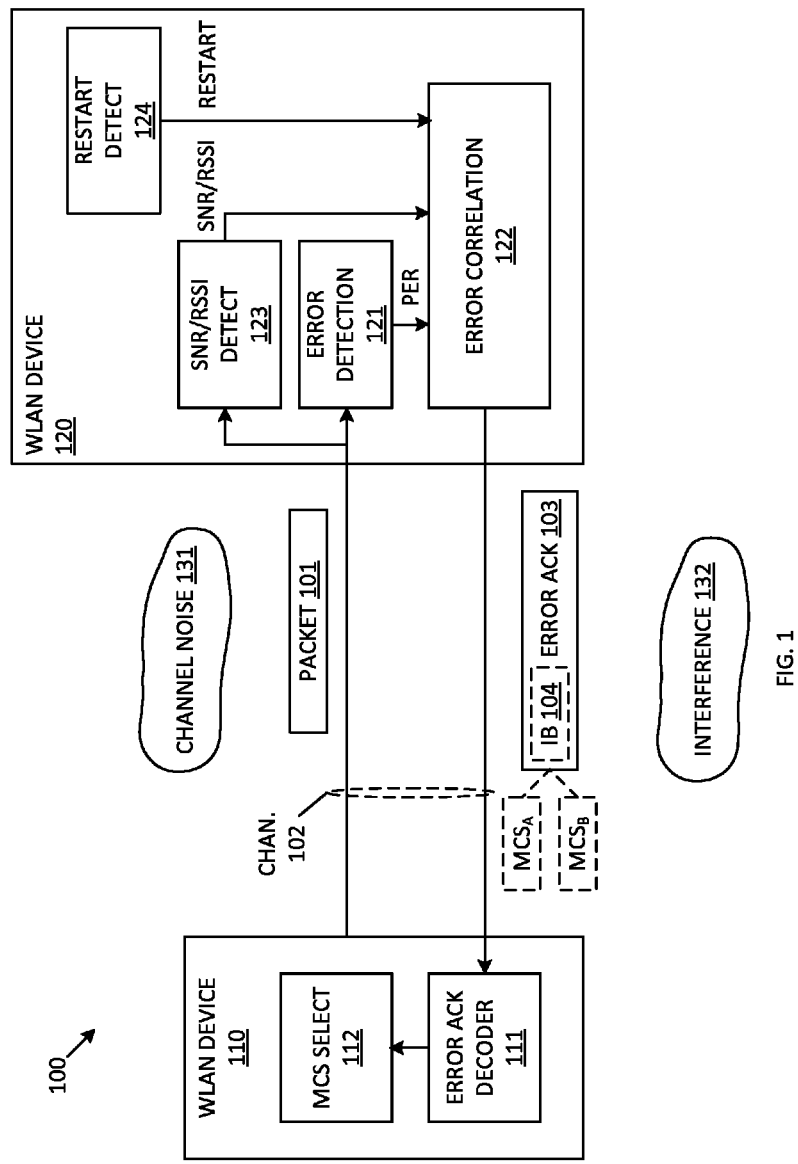
FIG. 1 is a block diagram of a wireless communication system in accordance with one embodiment.

FIG. 1 is a block diagram of a wireless local area network (WLAN) 100 in accordance with one embodiment of the present invention. WLAN 100 includes WLAN devices 110 and 120, which communicate on a wireless channel 102. In the described embodiments, WLAN devices operate in accordance with the IEEE 802.11 specification. However, it is understood that WLAN devices may operate in accordance with other protocols in other embodiments of the invention. WLAN device 110 may be, for example, a wireless access point (AP) or a Wi-Fi Direct point-to-point group owner (P2P-GO). WLAN device 120 may be, for example, a wireless station (STA) or a Wi-Fi Direct point-to-point client (P2P-client). These designations of WLAN devices 110 and 120 can be reversed in other embodiments. In the examples described herein, WLAN device 110 transmits packets (e.g., packet 101) to WLAN device 120 on channel 102, such that WLAN device 110 may be considered a wireless transmitter, and WLAN device 120 may be considered a wireless receiver. However, it is understood that WLAN device 120 is also capable of transmitting packets that are received by WLAN device 110. WLAN device 110 includes error acknowledgement decoder 111 and MCS selection logic 112, which are described in more detail below. WLAN device 120 includes error detection circuitry 121 and error correlation circuitry 122, which are described in more detail below.

Channel noise 131 and/or interference 132 may exist within WLAN system 100, and adversely affect the transmission of packet 101 on channel 102. The operation of WLAN system 100 will now be described in more detail.

Figure 2:
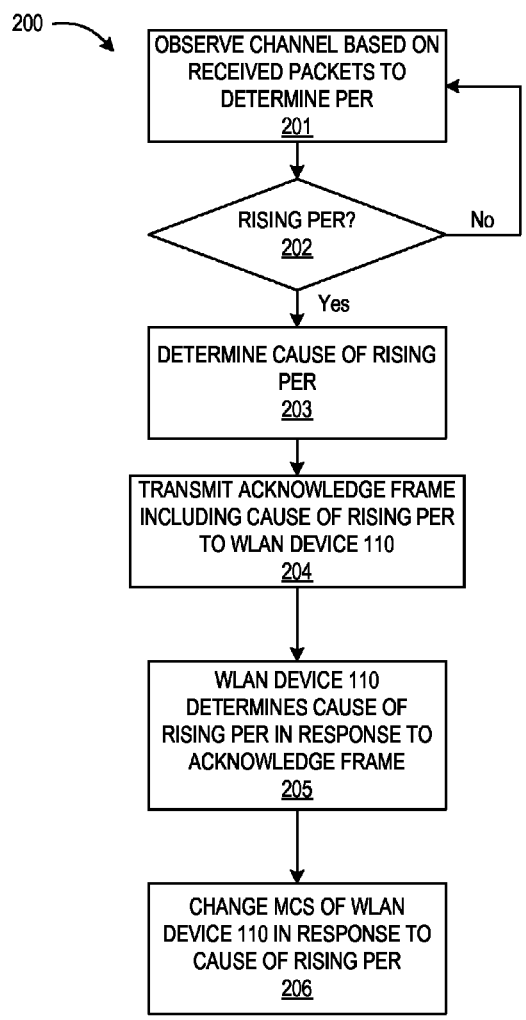
FIG. 2 is a flow diagram illustrating a method implemented by a wireless system receiver to identify a source of deteriorating channel conditions and report the source of the deteriorating channel conditions to a wireless system transmitter, in accordance with one embodiment.

FIG. 2 is a flow diagram 200 illustrating a method of operating WLAN system 100 in accordance with one embodiment of the present invention. WLAN device 110 transmits packets (including packet 101) to WLAN device 120 on a selected wireless channel 102 using a first modulation and coding scheme (MCS), as determined by MCS selection logic 112 within WLAN device 110. WLAN device 120 includes error detection circuitry 121, which receives the packet 101, and in response, determines a packet error rate (PER) (201). Error detection circuitry 121 provides the determined PER to error correlation circuitry 122. Error correlation circuitry 122 determines whether the PER is increasing (e.g., from packet to packet) (202). If error correlation circuitry 122 does not determine that the PER is rising (202, NO branch), then processing returns to 201.

If error correlation circuitry 122 determines that the PER is rising (202, YES branch), then error correlation circuitry 122 monitors one or more operating parameters of WLAN device 120 to determine whether the increasing PER is a result of channel noise 131 or interference 132 (203). Various methods used by error correlation circuitry 122 to determine whether increasing PER is a result of channel noise 131 or interference 132 are described in more detail below in connection with FIGS. 3 and 4.

Figure 3:
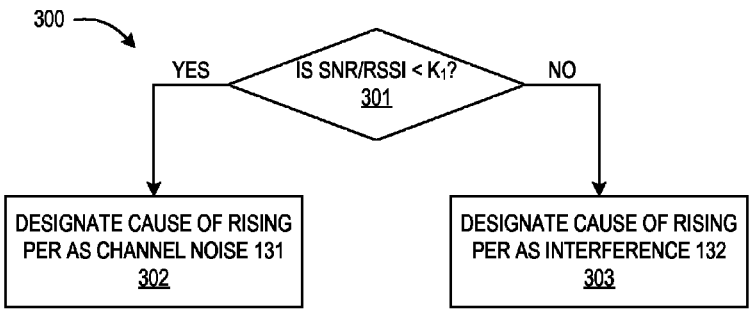
FIG. 3 is a flow diagram illustrating a method for determining whether deteriorating channel conditions are a result of channel noise or interference, in accordance with one embodiment.

FIG. 3 is a flow diagram 300 illustrating a method for determining whether an increasing PER is the result of channel noise 131 or interference 132 in accordance with one embodiment of the present invention. Error correlation circuit 122 monitors a correlation between the signal-to-noise ratio (SNR) and/or received signal strength indicator (RSSI) level (hereinafter referred to as SNR/RSSI level) of the received packet 101 and the PER (301). Note that the SNR/RSSI level of the received packet 101 can be determined within WLAN device 120 in various manners known to those of ordinary skill in the art. In the illustrated embodiments, SNR/RSSI detection circuitry 123 determines the SNR/RSSI levels. Error correlation circuit 122 determines whether the increasing PER is associated with a low SNR/RSSI level. For example, error correlation circuit 122 determines whether the SNR/RSSI level is less than a predetermined constant level $K_1$. If the SNR/RSSI level is less than the level $K_1$ (301, YES branch), then error correlation circuit 122 determines that the increasing PER is the result of channel noise 131 (302). This determination is made because it is expected that if the relatively constant channel noise 131 is significant enough to result in reception errors, then the reception of all packets will be adversely affected, resulting in a relatively low SNR/RSSI level for these received packets.

If the SNR/RSSI level is equal to or greater than the level $K_1$ (301, NO branch), then error correlation circuit 122 determines that the increasing PER is the result of interference 132 (303). This determination is made because it is expected that even if the intermittent interference 132 is significant enough to result in reception errors, many of the packets will be received without being adversely affected by the intermittent interference 132, resulting in a relatively high SNR/RSSI level.

Figure 4:
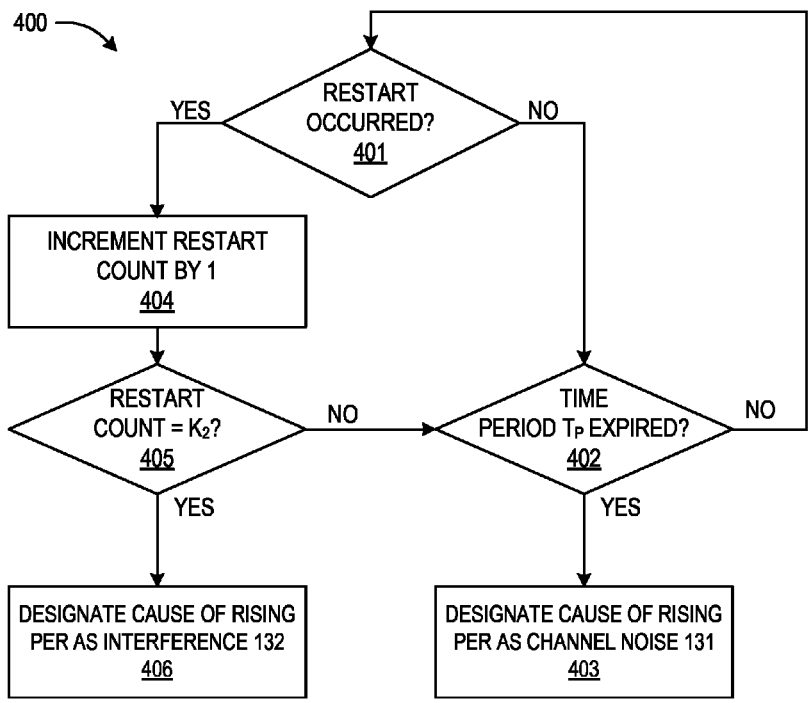
FIG. 4 is a flow diagram illustrating a method for determining whether deteriorating channel conditions are a result of channel noise or interference, in accordance with another embodiment.

FIG. 4 is a flow diagram 400 illustrating a method for determining whether an increasing PER is the result of channel noise 131 or interference 132, based upon counting a number of receiver restarts of WLAN device 120, in accordance with another embodiment of the present invention.

In 401, error correlation circuitry 122 determines whether the receiver circuitry of WLAN device 120 (e.g., the circuitry used to receive packet 101) has been restarted (401). In general, the receiver circuitry of WLAN device 120 is restarted when interference 132 disrupts the reception of packet 101. In accordance with one embodiment, restart detection circuitry 124 within WLAN device 120 detects each restart, and in response, provides an activated RESTART signal to error correlation circuitry 122.

If error correlation circuitry 122 determines that the receiver circuitry of WLAN device 120 has not been restarted (401, NO branch), then error correlation circuitry 122 determines whether a predetermined time period $T_P$ has elapsed (402). If not (402, NO branch) processing returns to 401. If time period $T_P$ elapses, and WLAN device 120 does not restart the receiver circuitry during this time period $T_P$ (402, YES branch), then error correlation circuit 122 determines that the increasing PER is the result of channel noise 131 (403). This determination is made because there were no detected instances of interference 132 disrupting the reception of a packet (i.e., no detected restarts).

If error correlation circuitry 122 determines that the receiver circuitry of WLAN device 120 has been restarted (401, YES branch), then error correlation circuitry 122 increments a restart count by one (404), and determines whether the restart count reaches a predetermined value $K_2$ (405). If the restart count has not reached the predetermined value $K_2$ (405, NO branch), then error correlation circuitry 122 determines whether the time period $T_P$ has elapsed (402).

If time period $T_P$ has not elapsed (402, NO branch), then processing returns to 401, and error correlation circuitry 122 is able to detect up to $K_2$ restarts during the time period $T_P$.

If error correlation circuit 122 fails to detect $K_2$ restarts during the time period $T_P$ (402, YES branch), then error correlation circuit 122 determines that the increasing PER is the result of channel noise 131 (403). This determination is made because there were not a significant number of detected instances of interference 132 disrupting the reception of a packet (i.e., the number of detected restarts<$K_2$).

If error correlation circuitry 122 detects $K_2$ restarts during the time period $T_P$ (405, YES branch), then error correlation circuit 122 determines that the increasing PER is the result of interference 132 (406). This determination is made because there were a significant number of detected instances of interference 132 disrupting the reception of a packet (i.e., the number of detected restarts=$K_2$). Although not illustrated in FIG. 4, it is understood that the restart count and time period $T_P$ are reset after each determination, and processing returns to 401.

Although the present invention has been described in connection with an error correlation circuit 122 that implements either the method 300 of FIG. 3 or the method 400 of FIG. 4, it is understood that in other embodiments, a combination of these methods 300 and 400 can be used to determine whether the increasing PER is a result of channel noise 131 or interference 132.

Returning to FIG. 2, upon determining the cause of the increasing PER, error correlation circuitry 122 generates an error acknowledgement message 103, which is transmitted to WLAN device 110 (204). The error acknowledgement message 103 includes an indication of the detected PER, as well as an indication of whether the errors associated with the PER were caused by channel noise 131 or interference 132. In various embodiments, the error acknowledgement message 103 may be a block acknowledgement (BA) frame or an acknowledgement (ACK) frame in accordance with the IEEE 802.11 specification.

In accordance with one embodiment of the present invention, the indication of whether the increase in the PER was caused by channel noise 131 or interference 132 is provided by one or more indicator bits (IB) 104 included in the error acknowledgement message 103. For example, if error acknowledgement message 103 is implemented using a BA frame in accordance with the IEEE 802.11 specification, then the indicator bits 104 may be implemented using one or more of the 9 reserved bits in the control field of the BA frame. Note that in this embodiment, the BA frame may also include a bit map that indicates whether or not specific sub-frames of the packet 101 were successfully received.

Figure 5:
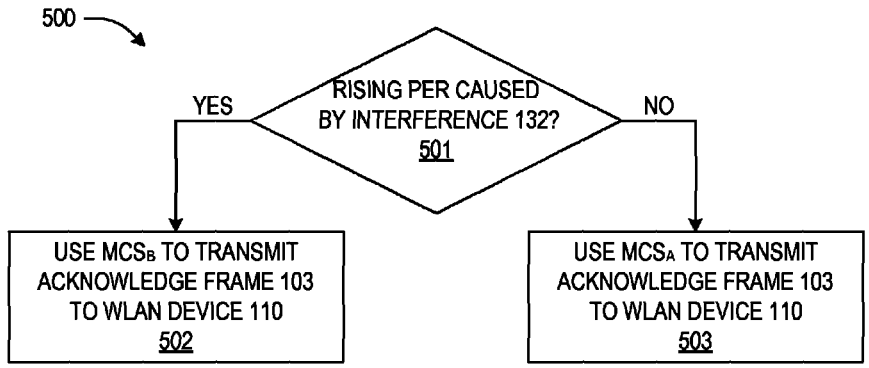
FIG. 5 is a flow diagram illustrating a method for selecting a modulation coding scheme (MCS) used to transmit a message from the receiver to the transmitter, wherein the MCS is selected to identify whether deteriorating channel conditions are a result of channel noise or interference, in accordance with one embodiment.

In accordance with another embodiment of the present invention, the indication of whether the increase in the PER was caused by channel noise 131 or interference 132 is provided by transmitting the error acknowledgement message 103 using a first MCS ($MCS_A$) if the increasing PER was caused by channel noise 131, and transmitting the error acknowledgement message 103 using a second MCS ($MCS_B$), (different than $MCS_A$) if the increasing PER was caused by interference 132. FIG. 5 is a flow diagram 500 illustrating this method, wherein error correlation circuitry 122 determines whether the rising PER was caused by interference 132 (501). If so (501, YES branch), then error correlation circuitry 122 causes WLAN device 120 to transmit the error acknowledgement message 103 using the second MCS ($MCS_B$) (502). If error correlation circuitry 122 determines whether the rising PER was not caused by interference 132 (501, NO branch), then error correlation circuitry 122 causes WLAN device 120 to transmit the error acknowledgement message 103 using the first MCS ($MCS_A$) (503). In one embodiment, the first MCS ($MCS_A$) is selected to specify a relatively low data rate when the rising PER is caused by channel noise 131 (503), and the second MCS (MCSB) is selected to specify a relatively high data rate when the rising PER is caused by interference 132 (502).

Within WLAN device 110, error acknowledgement decoder 111 receives the error acknowledgement message 103, and in response, determines whether the increasing PER was caused by signal noise 131 or interference 132 (205). Note that error acknowledgement decoder 111 can make this determination by decoding the indicator bits 104 of error acknowledgement message 103, or by determining whether the error acknowledgement message 103 is transmitted using $MCS_A$ or $MCS_B$, depending on the particular method used to encode this information.

Error acknowledgement decoder 111 then selects a MCS to be implemented by WLAN device 110 to transmit subsequent packets to WLAN device 120, wherein this MCS is selected in response to the cause of the increasing PER (206).

Figure 6:
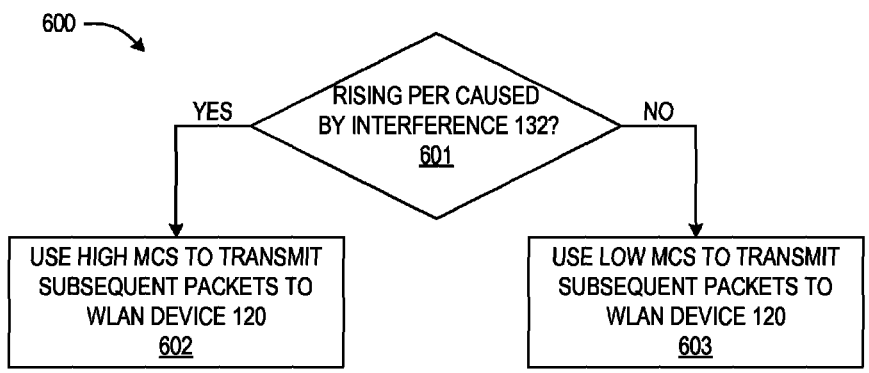
FIG. 6 is a flow diagram illustrating a method for selecting a modulation coding scheme (MCS) used to transmit future packets in response to whether deteriorating channel conditions are a result of channel noise or interference, in accordance with one embodiment.

FIG. 6 is a flow diagram 600 illustrating the manner in which error acknowledgement decoder 111 selects the MCS in accordance with one embodiment of the present invention. If error acknowledgement decoder 111 determines that the increasing PER was caused by interference 132 (601, YES branch), then error acknowledgement decoder 111 instructs MCS selection logic 112 within WLAN device 110 to use a high MCS (i.e., an MCS having a high PHY data rate) to transmit subsequent packets to WLAN device 120 (602). In this case, subsequent packets transmitted from WLAN device 120 to WLAN device 110 advantageously require less transmission time, thereby minimizing the chances that these subsequently transmitted packets will be transmitted at the same time as the detected interference signals (which are intermittently transmitted on an interfering channel).

Conversely, if error acknowledgement decoder 111 determines that the increasing PER was caused by channel noise 131 (601, NO branch), then error acknowledgement decoder 111 instructs MCS selection logic 112 to use a low MCS (i.e., an MCS having a low PHY data rate) with a high coding gain to transmit subsequent packets to WLAN device 120 (603). In this case, the subsequent packets transmitted from WLAN device 120 are more likely to be received by WLAN 110 without errors, due to the low MCS/high coding gain overcoming the channel noise 131.

In accordance with another embodiment of the present invention, WLAN device 110 changes how aggressively error acknowledgement decoder 111 lowers the MCS in response to detected channel noise 131, based on the rate of increase in the PER. For example, the error acknowledgement decoder 111 may aggressively lower the MCS (e.g., the PHY data rate) if the PER increases rapidly in response to channel noise 131.

In accordance with another embodiment, WLAN device 110 may cause error acknowledgement decoder 111 to remove the lowest MCS in response to detecting that the increased PER was caused by interference 132, effectively requiring the use of a high MCS in the manner required by 501 above.

In accordance with another embodiment of the present invention, WLAN device 110 (as a wireless AP), upon determining that the increased PER was caused by interference 132 (501), can elect to move from channel 102 to another channel, that is either farther away from the interference channel, or the same as the interference channel.

In accordance with another embodiment of the present invention, WLAN device 120 (as a wireless STA), upon determining that the increased PER was caused by interference 132 (203), can elect to search for (and associate with) another wireless AP.

In accordance with another embodiment of the present invention, WLAN device 120 can make other observations regarding channel 102, such as channel rank, wherein a high rank channel can support more spatial streams, while a low rank channel can support fewer spatial streams. WLAN device 120 transmits the channel rank to WLAN device 110 (e.g., in error acknowledge message 103). In response, WLAN device 110 changes its rate adaptation algorithm by using a different subset of the rate table. For instance, if WLAN device 120 indicates that channel 102 is a low rank channel, WLAN device 110 can modify its rate table (e.g., MCS select logic 112) to include more MCSs that implement two spatial streams (Nss=2), while excluding MCSs that implement three spatial streams (Nss=3).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

We claim:

1. A method of providing feedback on channel observations to a transmitter, the method comprising:
    observing a channel at a receiver based on received signals from the transmitter;
    determining from the received signals whether a packet error rate (PER) is rising at the receiver; and
    if the PER is rising:
        determining a cause of the rising PER is interference; sending a message using a first modulation coding scheme (MCS) to the transmitter designating the cause of the rising PER as interference, wherein the first MCS implements a higher data rate than a second MCS implemented by the transmitter.

2. The method of claim 1, further comprising if the PER is rising, designating in the message to the transmitter the cause of the rising PER as interference.

3. The method of claim 2, wherein determining the cause of the rising PER comprises:
    determining whether a signal to noise ratio (SNR) associated with the received signals is below a desired threshold;
    if the SNR is below the desired threshold, designating the cause of the rising PER as channel noise and sending a second message using a second MCS to the transmitter designating the cause of the rising PER as channel noise; and
    if the SNR is not below the desired threshold, designating the cause of the rising PER as interference.

4. The method of claim 2, wherein determining the cause of the rising PER comprises:
    determining whether a received signal strength indicator (RSSI) associated with the received signals is below a desired threshold;
    if the RSSI is below the desired threshold, designating the cause of the rising PER as channel noise and sending a second message using a second MCS to the transmitter designating the cause of the rising PER as channel noise; and
    if the RSSI is not below the desired threshold, designating the cause of the rising PER as interference.

5. The method of claim 2, wherein determining the cause of the rising PER comprises:
    determining whether the receiver has been restarted a first number of times during a first period; and
    designating the cause of the rising PER as interference if the receiver has been restarted the first number of times during the first period.

6. The method of claim 2, further comprising receiving a data signal from the transmitter at an increased data rate in response to the message designating the cause of the rising PER as interference.

7. The method of claim 2, further comprising receiving a data signal from the transmitter at a reduced data rate in response to a second message designating the cause of the rising PER as channel noise.

8. The method of claim 2, further comprising preventing the transmitter from using the first-MCS in response to detecting that the increased PER was caused by interference.

9. The method of claim 1, wherein the message comprises at least one of a block acknowledgement (BA) frame and an acknowledgement (ACK) frame.

10. A non-transitory, computer-readable medium storing computer-executable instructions for providing feedback on channel observations to a transmitter in a multi-user wireless communication system, the instructions when executed by a processor cause the processor to execute a process comprising:
    observing a channel at a receiver based on received signals from the transmitter;
    determining from the received signals whether a packet error rate (PER) is rising at the receiver; and
    if the PER is rising:
        determining a cause of the rising PER is interference; and
        sending a message using a first modulation coding scheme (MCS) to the transmitter designating the cause of the rising PER as interference, wherein the first MCS implements a higher data rate than a second MCS implemented by the transmitter.

11. The computer-readable medium of claim 10, wherein the instructions, when executed by a processor, further cause the processor to execute a process comprising: if the PER is rising, designating in the message to the transmitter the cause of the rising PER as interference.

12. The computer-readable medium of claim 11, wherein determining the cause of the rising PER comprises:
    determining whether a signal to noise ratio (SNR) associated with the received signals is below a desired threshold;
    if the SNR is below the desired threshold, designating the cause of the rising PER as channel noise and sending a second message using a second MCS to the transmitter designating the cause of the rising PER as channel noise; and
    if the SNR is not below the desired threshold, designating the cause of the rising PER as interference.

13. The computer-readable medium of claim 11, wherein determining the cause of the rising PER comprises:
    determining whether a received signal strength indicator (RSSI) associated with the received signals is below a desired threshold;
    if the RSSI is below the desired threshold, designating the cause of the rising PER as channel noise and sending a second message using a second MCS to the transmitter designating the cause of the rising PER as channel noise; and
    if the RSSI is not below the desired threshold, designating the cause of the rising PER as interference.

14. The computer-readable medium of claim 11, wherein determining the cause of the rising PER comprises:
    determining whether the receiver has been restarted a first number of times during a first period; and
    designating the cause of the rising PER as interference if the receiver has been restarted the first number of times during the first period.

15. The computer-readable medium of claim 11, further comprising receiving a data signal from the transmitter at an increased data rate in response to the message designating the cause of the rising PER as interference.

16. The computer-readable medium of claim 11, further comprising receiving a data signal from the transmitter at a reduced data rate in response to a second message designating the cause of the rising PER as channel noise.

17. The computer-readable medium of claim 11, further comprising preventing the transmitter from using the first MCS in response to detecting that the increased PER was caused by interference.

18. The computer-readable medium of claim 11, wherein the message comprises at least one of a block acknowledgement (BA) frame and an acknowledgement (ACK) frame.

19. A wireless receiver comprising:
  error detection circuitry configured to determine a packet error rate (PER) from signals received from a transmitter; and
  error correlation circuitry configured to determine whether the PER is rising at the receiver based on the PER determined by the error detection circuitry, correlate a rising PER with interference, and send a message using a first modulation coding scheme (MCS) to the transmitter designating the cause of the rising PER as interference, wherein the first MCS implements a higher data rate than a second MCS implemented by the transmitter.

20. The wireless receiver of claim 19, wherein the error correlation circuitry is further configured to designate in the message to the transmitter the cause of the rising PER as interference.

21. The wireless receiver of claim 20, further comprising signal to noise ratio (SNR) detection circuitry configured to determine a SNR associated with the received signals, wherein the error correlation circuitry is configured to receive the determined SNR and designate the cause of the rising PER as channel noise if the determined SNR is below a desired threshold and send a second message using a second MCS to the transmitter designating the cause of the rising PER as channel noise, and designate the cause of the rising PER as interference if the determined SNR is not below the desired threshold.

22. The wireless receiver of claim 20, further comprising received signal strength indicator (RSSI) detection circuitry configured to determine a RSSI associated with the received signals, wherein the error correlation circuitry is configured to receive the determined RSSI and designate the cause of the rising PER as channel noise if the determined RSSI is below a desired threshold and send a second message using a second MCS to the transmitter designating the cause of the rising PER as channel noise, and designate the cause of the rising PER as interference if the determined RSSI is not below the desired threshold.

23. The wireless receiver of claim 20, further comprising restart detection circuitry configured to indicate to the error correlation circuitry when the wireless receiver is restarted, wherein the error correlation circuitry is configured to designate the cause of the rising PER as interference if the wireless receiver has been restarted a first number of times during a first period.

24. The wireless receiver of claim 19, wherein the message comprises at least one of a block acknowledgement (BA) frame and an acknowledgement (ACK) frame.

* * * * *